(12) United States Patent
Pestov

(10) Patent No.: US 11,391,596 B2
(45) Date of Patent: Jul. 19, 2022

(54) SYSTEM AND METHOD FOR CONVERGING MEDIATED REALITY POSITIONING DATA AND GEOGRAPHIC POSITIONING DATA

(71) Applicant: VGIS INC., Toronto (CA)

(72) Inventor: Alexandre Pestov, Toronto (CA)

( * ) Notice: Subject to any disclaimer, the term of this patent is extended or adjusted under 35 U.S.C. 154(b) by 105 days.

(21) Appl. No.: 16/860,479

(22) Filed: Apr. 28, 2020

(65) Prior Publication Data

US 2021/0333121 A1    Oct. 28, 2021

(51) Int. Cl.
    *G01C 21/36*    (2006.01)
    *G06F 3/0346*   (2013.01)
    *G01S 19/10*    (2010.01)
    *G06T 11/00*    (2006.01)

(52) U.S. Cl.
    CPC .......... *G01C 21/367* (2013.01); *G01S 19/10* (2013.01); *G06F 3/0346* (2013.01); *G06T 11/00* (2013.01)

(58) Field of Classification Search
    None
    See application file for complete search history.

(56) References Cited

U.S. PATENT DOCUMENTS

| | | | | |
|---|---|---|---|---|
| 5,266,958 A | * | 11/1993 | Durboraw, III | G01S 3/48 342/357.31 |
| 8,712,686 B2 | * | 4/2014 | Bandyopadhyay .. | G01C 21/165 701/446 |
| 10,432,888 B2 | * | 10/2019 | Hurd | G01S 19/45 |
| 10,679,509 B1 | * | 6/2020 | Yarlagadda | G06N 20/20 |
| 11,113,544 B2 | * | 9/2021 | Lee | G01C 21/3602 |
| 2004/0105573 A1 | * | 6/2004 | Neumann | G06T 17/00 382/103 |
| 2016/0097861 A1 | * | 4/2016 | Li | H04W 4/029 342/357.65 |
| 2019/0197982 A1 | * | 6/2019 | Chi | G06T 7/0002 |
| 2019/0251373 A1 | * | 8/2019 | Lee | G05D 1/0231 |
| 2020/0327732 A1 | * | 10/2020 | Nichols | G06T 15/10 |
| 2021/0097282 A1 | * | 4/2021 | Pestov | G06T 1/0014 |

(Continued)

FOREIGN PATENT DOCUMENTS

WO    2020/006299 A1    1/2020

OTHER PUBLICATIONS

Zheng, Mengya & Campbell, Abraham. (2019). Location-Based Augmented Reality In-situ Visualization Applied for Agricultural Fieldwork Navigation. 10.1109/ISMARAdjunct. 2019 .00039.

(Continued)

*Primary Examiner* — David H Chu
(74) *Attorney, Agent, or Firm* — Bhole IP Law; Anil Bhole; Marc Lampert

(57) ABSTRACT

There is provided a system and method for converging mediated reality (MR) positioning data and geographic positioning data. The method including: receiving three or more geographic coordinate points, the geographic coordinate points each associated with different points in time; receiving three or more MR coordinate points, each of the MR coordinate points associated with one of the points in time; determining a geographic trend line from the geographic coordinate points; determining an MR trend line from the MR coordinate points; determining a correction angle as an angle between the geographic trend line and the MR trend line; and outputting the correction angle.

20 Claims, 16 Drawing Sheets

(56) References Cited

U.S. PATENT DOCUMENTS

2021/0097760 A1\* 4/2021 Pestov ................ G06F 16/5866
2021/0343087 A1\* 11/2021 Gomez Gonzalez ........................
G06T 19/006

OTHER PUBLICATIONS

Roberts, Gethin & Evans, Andrew & Dodson, Alan & Denby, Bryan & Cooper, Simon & Hollands, Robin. (2002). The Use of Augmented Reality, GPS and INS for Subsurface Data Visualisation.

\* cited by examiner

1. Compass

2. Multi-antenna

3. GNSS Vector

SYSTEM AND METHOD FOR CONVERGING MEDIATED REALITY POSITIONING DATA AND GEOGRAPHIC POSITIONING DATA

TECHNICAL FIELD

The following relates generally to mediated reality devices; and more particularly, to systems and methods for converging mediated reality (MR) positioning data and geographic positioning data.

BACKGROUND

Surveying firms, mapping firms, municipalities, public utilities, and many other entities, collect, store, use, and disseminate vast amounts of geospatial data. This geospatial data can be used to manage daily operations and conduct mission-critical tasks; for example, asset maintenance, construction plan design, zoning proposals, among many others.

Mediated reality (MR) systems, including augmented reality (AR), mixed reality, and virtual reality (VR), provide interactive experiences with a real-world and/or virtual world environment. In such cases, objects that reside in the real world can be augmented or represented by computer-generated perceptual information. As an application of such mediated reality systems, geospatial data can be augmented or represented to a user in comparison to real-world object/asset locations. However, often the location of such digital representations may be inaccurate; and additional techniques, such as employing outputs from navigation satellite systems (GNSS) are typically required. These additional positioning techniques help ensure more accurate horizontal and vertical position. However, maintaining heading (also referred to as 'directional orientation') is a substantial technical challenge.

SUMMARY

In an aspect, there is provided a computer-implemented method for converging mediated reality (MR) positioning data and geographic positioning data, the method comprising: receiving three or more geographic coordinate points, the geographic coordinate points each associated with different points in time; receiving three or more MR coordinate points, each of the MR coordinate points associated with one of the points in time associated with one of the geographic coordinate points; determining a geographic trend line from the geographic coordinate points; determining an MR trend line from the MR coordinate points; determining a correction angle as an angle between the geographic trend line and the MR trend line; and outputting the correction angle.

In a particular case of the method, the method further comprising adjusting orientation of a virtual viewpoint by the correction angle, the virtual viewpoint comprising positions of virtual geospatial objects present in a mediated reality environment.

In another case of the method, the method further comprising displaying the virtual geospatial objects in the adjusted virtual viewpoint superimposed on an image of a real scene captured as part of the mediated reality.

In yet another case of the method, the MR positioning data comprises at least one of photogrammetry data, accelerometer data, inertial sensor data, and gyroscope data for determining orientation.

In yet another case of the method, the method further comprising receiving a geographic coordinate point and an MR coordinate point associated with a subsequent point in time, and repeating determining the geographic trend line, determining the MR trend line, determining the correction angle, and outputting the correction angle.

In yet another case of the method, the geographic coordinate points form a set of geographic coordinate points of a predetermined size, wherein the MR coordinate points form a set of MR coordinate points of the predetermined size, wherein for each subsequent point in time, the set of geographic coordinate points comprises the geographic coordinate point at the subsequent point in time and geographic points in time associated with preceding points in time until the set of geographic points equals the predetermined size, and the set of MR coordinate points comprises the MR coordinate point at the subsequent point in time and MR points in time associated with preceding points in time until the set of MR points equals the predetermined size.

In yet another case of the method, the geographic trend line and the MR trend line are determined using a regression analysis.

In yet another case of the method, the method further comprising determining a geographic path from the geographic coordinate points and determining an MR path from the MR coordinate points.

In another aspect, there is provided a system for converging mediated reality (MR) positioning data from an MR device and geographic positioning data from a geographic receiver, the system comprising one or more processors and data storage memory in communication with the one or more processors, the one or more processors configured to execute: a receiver module to receive three or more geographic coordinate points, the geographic coordinate points each associated with different points in time; an MR module to receive three or more MR coordinate points, each of the MR coordinate points associated with one of the points in time associated with one of the geographic coordinate points; a positioning module to determine a geographic trend line from the geographic coordinate points, determine an MR trend line from the MR coordinate points; and a correction module to determine a correction angle as an angle between the geographic trend line and the MR trend line and output the correction angle.

In a particular case of the system, the correction module further adjusts orientation of a virtual viewpoint by the correction angle, the virtual viewpoint comprising positions of virtual geospatial objects present in a mediated reality environment.

In another case of the system, the mediated reality device displays the virtual geospatial objects in the adjusted virtual viewpoint superimposed on an image of a real scene captured by the mediated reality device.

In yet another case of the system, the MR positioning data comprises at least one of photogrammetry data, accelerometer data, inertial sensor data, and gyroscope data, as determined by the MR device, for determining orientation.

In yet another case of the system, the receiver module further receives a geographic coordinate point associated with a subsequent point in time and the MR module further receives an MR coordinate point associated with the subsequent point in time, the processor repeating execution of determining the geographic trend line, determining the MR trend line, determining the correction angle, and outputting the correction angle.

In yet another case of the system, wherein the geographic coordinate points form a set of geographic coordinate points of a predetermined size, wherein the MR coordinate points form a set of MR coordinate points of the predetermined size, wherein for each subsequent point in time, the set of geographic coordinate points comprises the geographic coordinate point at the subsequent point in time and geographic points in time associated with preceding points in time until the set of geographic points equals the predetermined size, and the set of MR coordinate points comprises the MR coordinate point at the subsequent point in time and MR points in time associated with preceding points in time until the set of MR points equals the predetermined size.

In yet another case of the system, the geographic trend line and the MR trend line are determined using a regression analysis.

In yet another case of the system, the receiver module further determines a geographic path from the geographic coordinate points and the MR module further determines an MR path from the MR coordinate points.

In another aspect, there is provided a mediated reality (MR) device comprising a processor, a memory, a geographic receiver, a display, and a camera, the processor configured to execute: a receiver module to receive three or more geographic coordinate points from the geographic receiver, the geographic coordinate points each associated with different points in time; an MR module to determine three or more MR coordinate points using images received from the camera each of the MR coordinate points associated with one of the points in time; a positioning module to determine a geographic trend line from the geographic coordinate points, determine an MR trend line from the MR coordinate points; and a correction module to determine a correction angle as an angle between the geographic trend line and the MR trend line and output the correction angle.

In a particular case of the MR device, the correction module further orientation of a virtual viewpoint by the correction angle, the virtual viewpoint comprising positions of virtual geospatial objects present in a mediated reality environment.

In another case of the MR device, the display displays the virtual geospatial objects in the adjusted virtual viewpoint superimposed on an image of a real scene captured by the camera.

In yet another case of the MR device, the MR positioning data comprises at least one of data from optical tracking, data from an accelerometer, data from an inertial sensor, and data from a gyroscope, for determining orientation.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
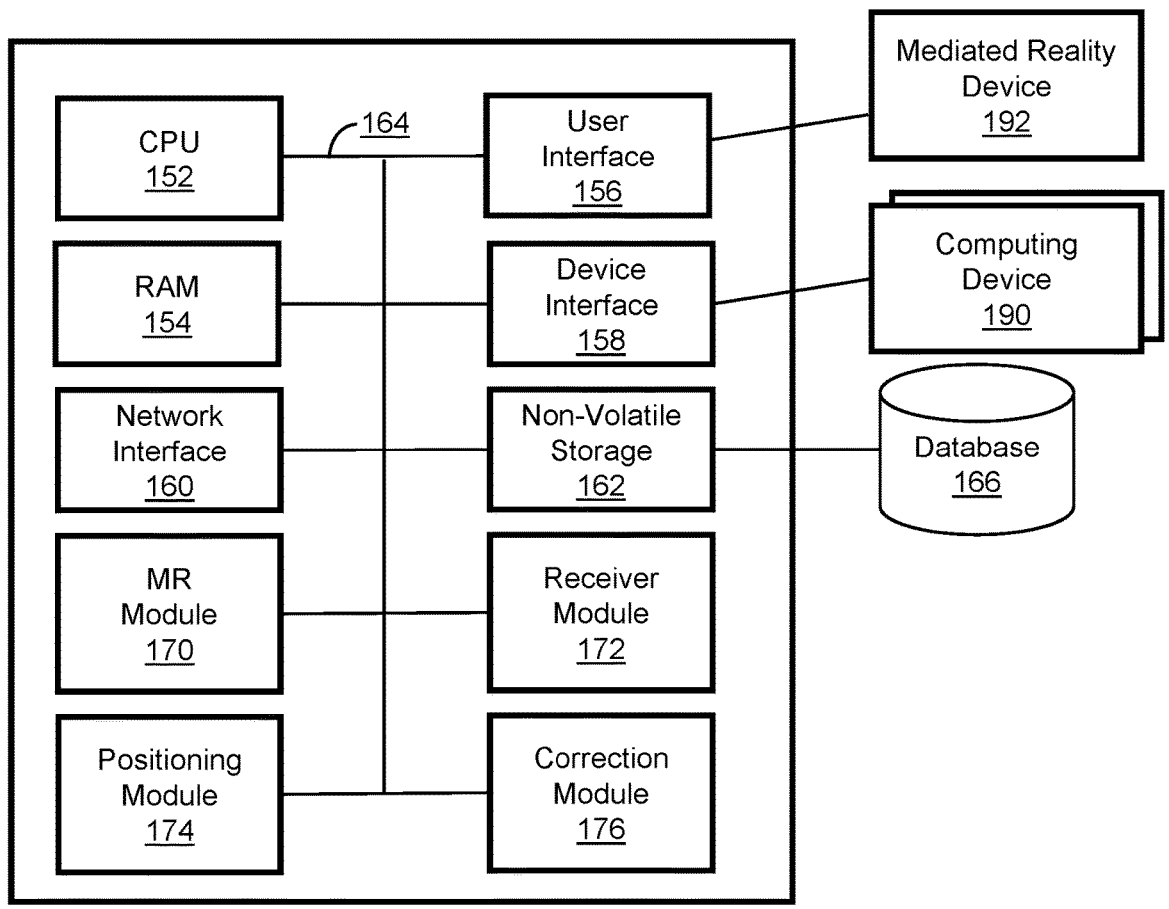
FIG. 1 illustrates a block diagram of a system of for converging mediated reality (MR) positioning data and geographic positioning data, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

The following relates generally to geospatial data management; and more particularly, to systems and methods for converging mediated reality (MR) positioning data and geographic positioning data.

While the following disclosure refers to mediated reality, it is contemplated that this includes any suitable mixture of virtual aspects and real aspects; for example, augmented reality (AR), mixed reality, modulated reality, holograms, and the like. The mediated reality techniques described herein can utilize any suitable hardware; for example, smartphones, tablets, mixed reality devices (for example, Microsoft™ HoloLens™), true holographic systems, purpose-built hardware, and the like.

In some cases, geospatial data can be located on a database such as a geographic information systems (GIS) or other suitable repository after having been collected or created using any suitable approach; as an example, collected using high-precision global navigation satellite systems (GNSS) and/or real-time kinematic (RTK) positioning.

Turning to FIG. 1, a system for converging mediated reality (MR) positioning data and geographic positioning data 150 is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, a mixed reality device (for example, a Microsoft™ HoloLens™), true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device with a display suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen).

The network interface 160 and/or the device interface 158 permits communication with other systems or devices, such as other computing devices and servers remotely located from the system 150. The device interface 158 can communicate with one or more other computing devices 190 that are either internal or external to the system 150; for example, a GNSS receiver to capture a position and/or elevation, a camera or camera array to capture image(s) of a scene, sensors for determining position and/or orientation (for example, time-of-flight sensors, compass, depth sensors, spatial sensors, inertial measurement unit (IMU), laser mapping, and the like). In some cases, at least some of the computing devices 190 can be collocated or part of the mediated reality device 192. In some embodiments, the device interface 158 can receive and send data to other devices, such as positions, elevations, and images, which have been previously captured, from the local database 166 or a remote database via the network interface 160.

Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of functional modules to be executed on the one or more processors 152, including an MR position module 170, a receiver module 172, a positioning module 174, and a correction module 176. In further cases, the functions of the modules can be combined or executed by other modules.

Figure 3:
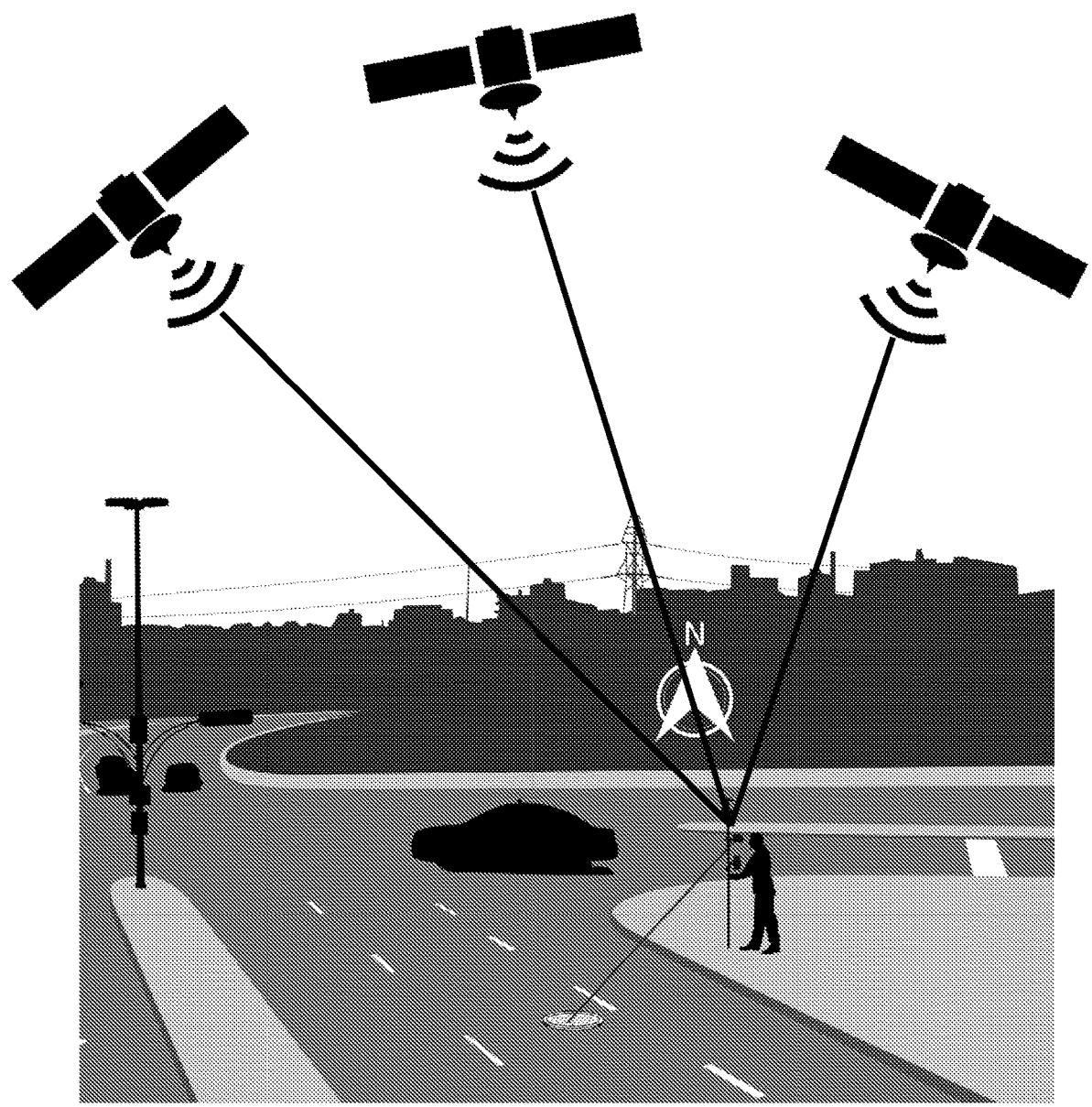
FIG. 3 illustrates a diagrammatic example of receiving geographic positioning data from an antenna.

FIG. 3 illustrates a diagrammatic example of a GNSS positioning system to determine a position of the system 150. As illustrated, the receiver module 172 of the system 150 determines the position, velocity, and precise time by processing the signals received from multiple satellites via a GNSS receiver computing device 190. The position and velocity can be determined periodically or at any suitable times. GNSS can use satellites from one or more positioning systems, including global position system (GPS), global navigation satellite system (GLONASS), Galileo, Beidou, quasi-zenith satellite system (QZSS), and other regional systems. Based distance estimates determined from the multiple GNSS satellites, the GNSS receiver can determine position data; for example, including one or more of latitude, longitude, and elevation relative to the Earth or relative to a structure or object on the Earth.

While the present embodiments describe using GNSS, it is appreciated that any spatial positioning frameworks of commercially suitable accuracy can be used; for example, GPS, GLONASS, Galileo, Beidou, QZSS, Wi-Fi positioning system (WPS), cellular network positioning, real-time kinematic (RTK) positioning, and/or other approaches.

Figure 5:
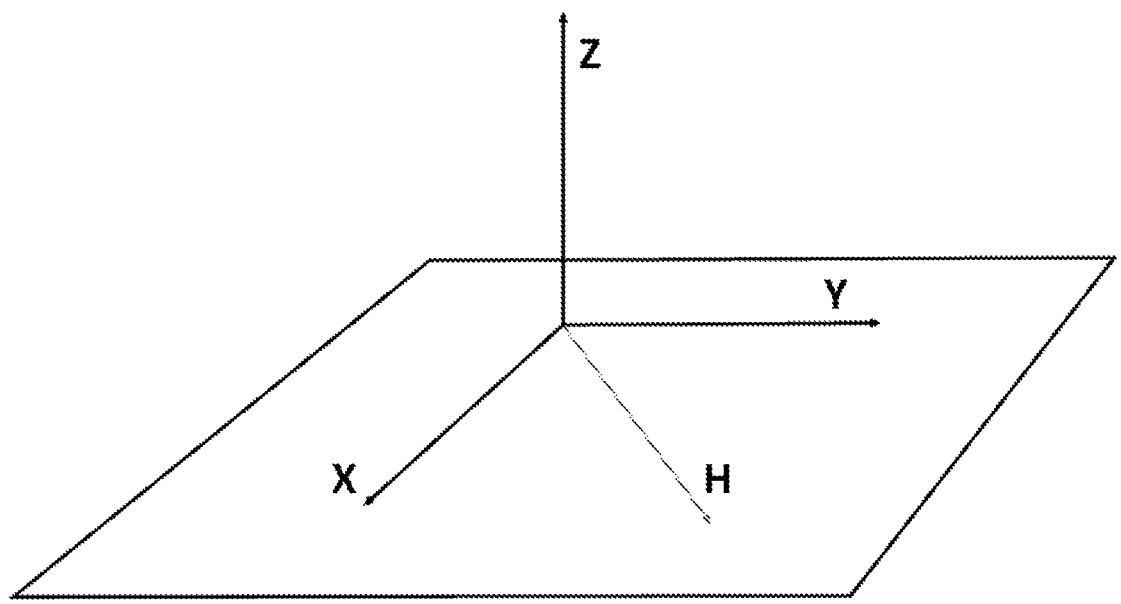
FIG. 5 illustrates a representation of a coordinate (X, Y, Z) with a heading (H)
Figure 6A:
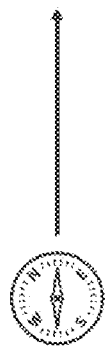
FIG. 6A illustrates a diagram of determining heading using a compass.
Figure 6B:
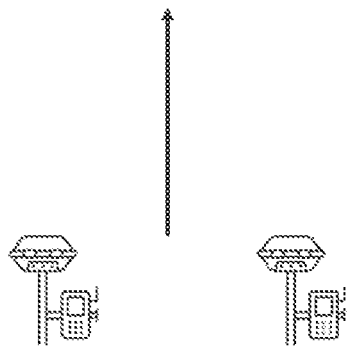
FIG. 6B illustrates a diagram of determining heading using multi-antenna.
Figure 6C:
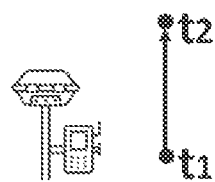
FIG. 6C illustrates a diagram of determining heading using a vector approach

Generally, it is difficult to maintain accurate headings (also referred to as 'directional orientation' or just 'orientation') when using geographic positioning, such as with the GNSS receiver. As represented in the diagram of FIG. 5, GNSS devices are generally useful for maintaining accurate coordinate (X, Y, Z) placement in space, but are insufficient to maintain accurate headings (H). As illustrated in FIGS. 6A to 6C, there are various approaches for determining heading. Among them is a compass, as illustrated in FIG. 6A, but this approach is very inaccurate and can be distorted by extrinsic magnetic fields. As illustrated in FIG. 6B, there is a multi-antenna approach, but this requires several antennas spaced relatively wide apart, which is not practical for handheld or other compact devices. As illustrated in FIG. 6C, there is also a vector approach, which involves measuring vectors between a last coordinate position and a current coordinate position to determine direction. However, as illustrated in the precision vs. accuracy graphs of FIG. 7, a substantial technical challenge with GNSS, and other positioning systems, is that it provides coordinate positions (also referred to as points) within a given error range, rather than a precise location. This creates an unavoidable error not only in positioning determinations but also in directional or heading determinations.

Figure 4:
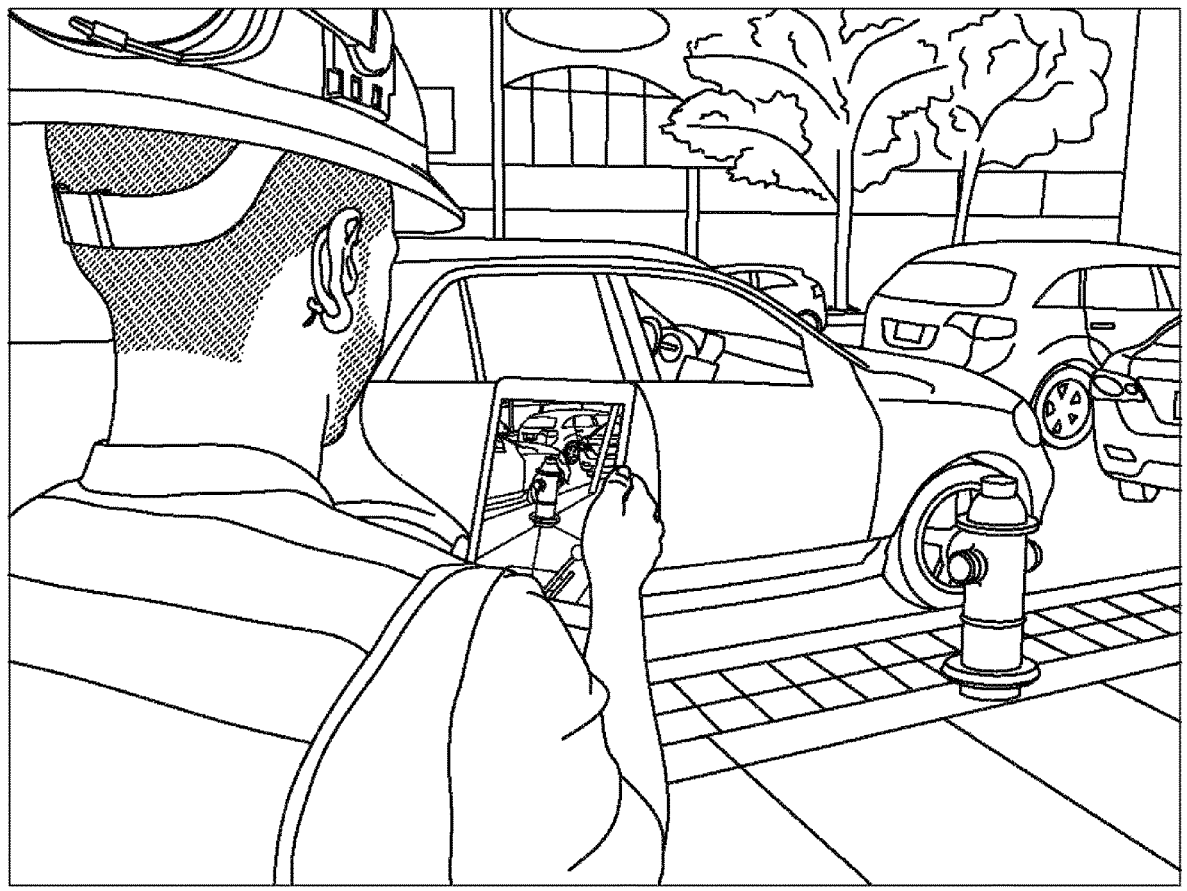
FIG. 4 illustrates an example of a user using a mediated reality device to view a geospatial object superimposed on an image captured by a camera.

FIG. 4 illustrates an example of a user using the mediated reality device 192 (a tablet computer) to view an object in the geospatial data (a fire hydrant) superimposed on an image captured by the camera or a virtual representation. The camera can be part of the mediated reality device 192, a stand-alone computing device 190, or part of another computing device 190. In some cases, there can be multiple cameras. In some cases, the mediated reality device 192, the MR position module 170, or a combination, can determine position using optical tracking (also known as photogrammetry); for example, using computer vision recognition of objects in the environment. In some cases, the mediated reality device 192 can include one or more other sensors to determine position and/or orientation; for example, accelerometers, inertial sensors, and/or gyroscopes. In an example, a MEMS sensor can be used as a six-axis inertial sensor to detect rotation, yaw, pitch, and roll, and the like. Position includes a coordinate (for example, three-dimensional) representing the relative position of the mediated reality device 192 and orientation (for example, a three-dimensional vector) includes representations of the relative heading or direction of the mediated reality device 192. The MR position module 170 can determine position and orientation periodically, or at any suitable time.

For accurate placement of the geospatial object relative to the environment by the mediated reality device 192, positioning and orientation of the system 150 need to be determined. The MR positioning data determined by the MR position module 170 and the geographic positioning data determined by the receiver module 172 can be used conjunctively by the positioning module 174 to determine an accurate position of the system 150. Generally, due to inherent inaccuracies, the MR positioning data determined by the MR position module 170 and the geographic positioning data determined by the positioning module 174 can differ.

Figure 7:
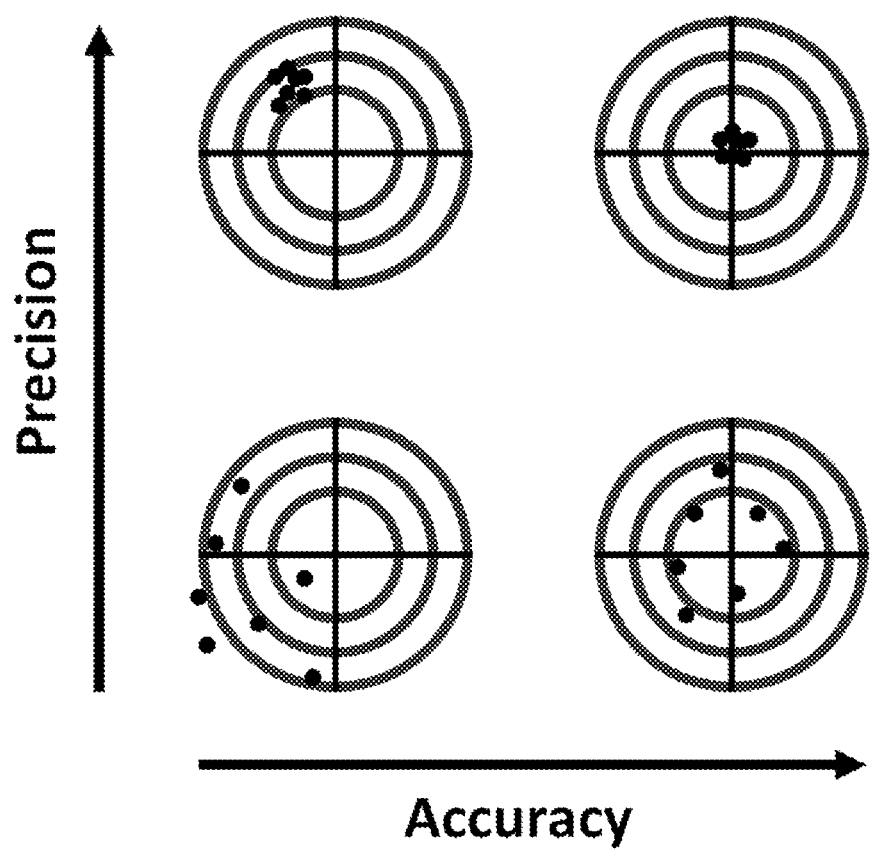
FIG. 7 illustrates an example of a geographic receiver receiving coordinate points within a range rather than a precise location.

MR positioning data is generally less accurate due to requiring initialization; such as having to establish a temporary local reference frame with a first predetermined point. Additionally, MR positioning data generally has unsatisfactory accuracy and is prone to drift over time and distance. Further, as described above, coordinate positioning data (such as from GNSS) can also have inherent error and imprecision. Thus, the MR positioning data and the geographic positioning data must be reconciled from time-to-time to ensure proper placement of the geospatial objects relative to the environment. Due to virtual abstraction, optical (or other sensor) based tracking that are used by MR can result in a "drift" or deterioration of positioning accuracy over time. GNSS, on the other hand, can maintain accuracy within a certain range. However, GNSS signal is chaotic within such range, as illustrated in FIG. 7. Thus, if only GNSS positioning is used, the MR visuals are likely to jitter constantly, resulting in a poor user experience. Therefore reconciling MR-based positioning and GNSS-based positioning can provide necessary adjustments for enhanced accuracy and user experience. In some cases, the MR positioning data and the geographic positioning data can be reconciled using a vector approach; which is similar to the heading determination approach using GNSS described above with reference to FIG. 6C. In such an approach, generally two separate frames are maintained, a vision frame comprising MR coordinate points (such as from positioning data from an AR device) and a geographic frame comprising geographic coordinate points (such as positioning data from GNSS). From time-to-time, the two frames are reconciled in order to reconcile the two positioning data sources.

According to the vector approach, a first geographic coordinate point within the geographic frame is determined at a first geographic time. Then, a second geographic coordinate point within the geographic frame is determined at a second geographic time. The first geographic coordinate point and the second geographic coordinate point can then form a geographic vector. Similarly, a first MR coordinate point within the vision frame is determined at a first vision time. Then, a second MR coordinate point within the vision frame is determined at a second vision time. The first MR coordinate point and the second MR coordinate point can then form a vision vector.

According to the vector approach, the geographic frame or the vision frame is shifted so that the second geographic point is aligned with the second vision point. The angle formed by the geographic vector and the vision vector can then be calculated. Then, either the geographic frame can be rotated to the vision frame or the vision frame can be rotated to the geographic frame by the calculated angle.

The vector approach generally treats the geographic positioning data as accurate and reconciles the less-reliable MR positioning data to the geographic positioning data. In this way, even if the MR positioning data drifts, which the MR module 170 may not be able to recognize, the geographic positioning data from the receiver module 172 would be able to recognize the drift and the system 150 would be able to correct for it. While the vector approach provides the ability to reconcile the MR positioning data and the geographic positioning data, it generally fails to address the error and randomness inherent in the geographic positioning data (such as positioning data received from GNSS), resulting in under-correcting or over-correcting the heading.

Advantageously, the present embodiments at least address the substantial technical challenges present in having to deal with the error and randomness inherent in the geographic positioning data when reconciling the MR positioning data and the geographic positioning data.

Figure 2:
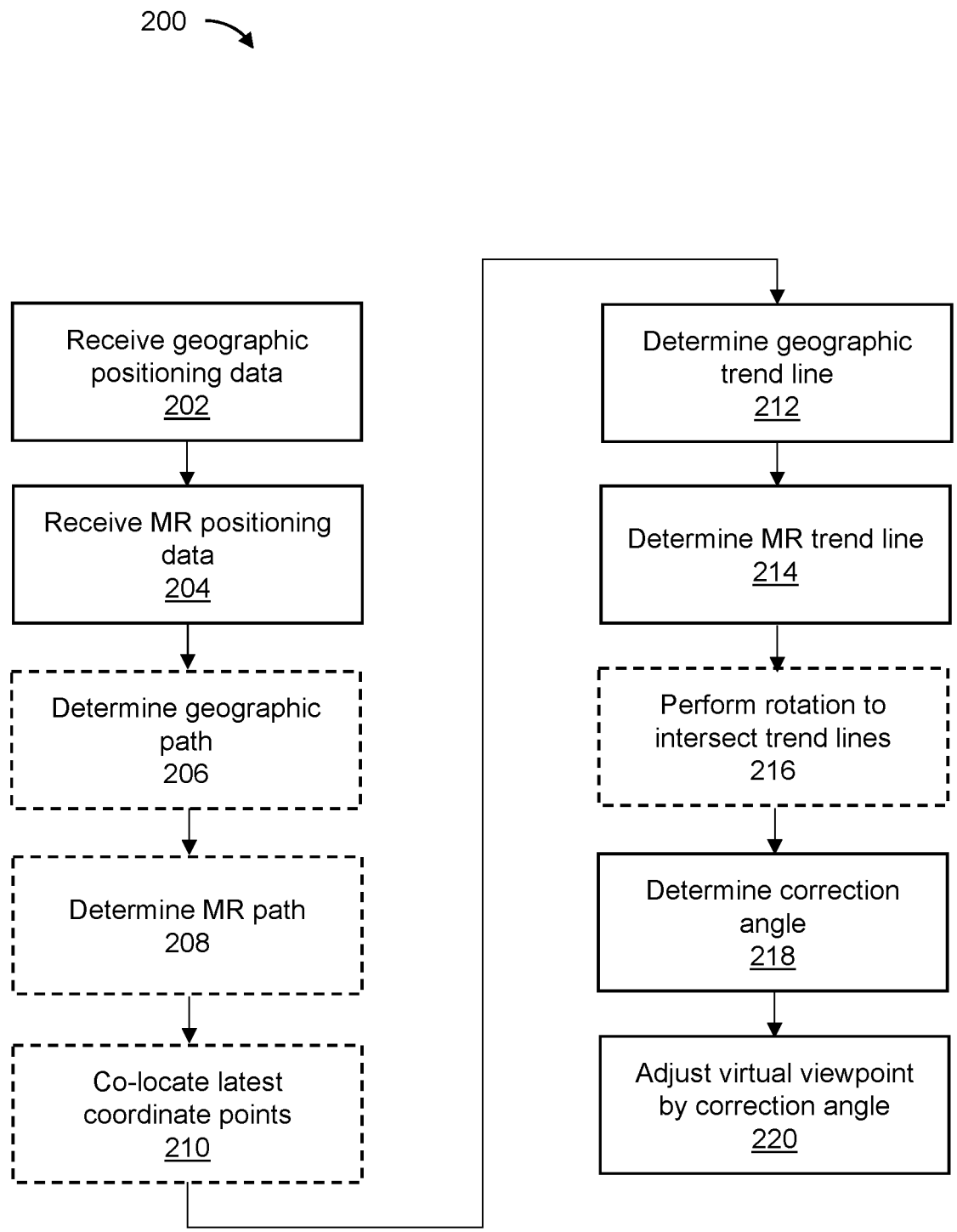
FIG. 2 illustrates a flow diagram of a method for converging mediated reality (MR) positioning data and geographic positioning data, according to an embodiment.

Turning to FIG. 2, a flowchart for a method for converging mediated reality (MR) positioning data and geographic positioning data 200 is shown, according to an embodiment. At block 202, the receiver module 172 receives geographic positioning data, via a receiver computing device 190, comprising a plurality of geographic coordinate points. Each geographic coordinate point comprising a position of the system 150 received at a respective point in time (t). In some cases, each geographic coordinate point comprising X and Y coordinates along the surface of the Earth and a Z coordinate as an elevation relative to the surface of the Earth.

At block 204, the MR position module 170 determines MR positioning data comprising a plurality of MR coordinate points using camera images and/or other sensor information received from the mediated reality device 192. The camera images and/or other sensor information capture a real scene of real objects. In some cases, MR positioning data is determined using optical tracking (photogrammetry). In some cases, the other sensor information comprising the MR positioning data can include data from accelerometers, inertial sensors, and/or gyroscopes; particularly, as a means for determining and keeping track of orientation of images captured by the camera. Each MR coordinate point comprising a position of the system 150 received at, or around, an associated point in time (t) of one of the geographic coordinate points. In further cases, the points in time collected of the MR positioning data can occur more or less frequently than the points in time collected of the geographic positioning data, and points in time of the MR coordinate points can be associated with a point in time of a geographic positioning data that is nearest in time. In some cases, each MR coordinate point comprising X and Y coordinates along the surface of the Earth and a Z coordinate as an elevation relative to the geoid, ellipsoid that encircles the Earth or from other abstract point. As the system 150 moves in space, the MR position module 170 records positions of the virtual camera for every period of time (for example, every n-milliseconds). In some cases, the MR position data, in x,y,z virtual space, can be converted into latitude, longitude, and elevation so that they can be reconciled against the receiver position readings. In an example, the closest (time-wise) MR positions are kept as corresponding entries to the GNSS positions at that respective time; with other MR position reading discarded. In further cases, the GNSS positions can be converted to the virtual space, and can be reconciled to the MR position readings, opposite to as described above.

Figure 8:
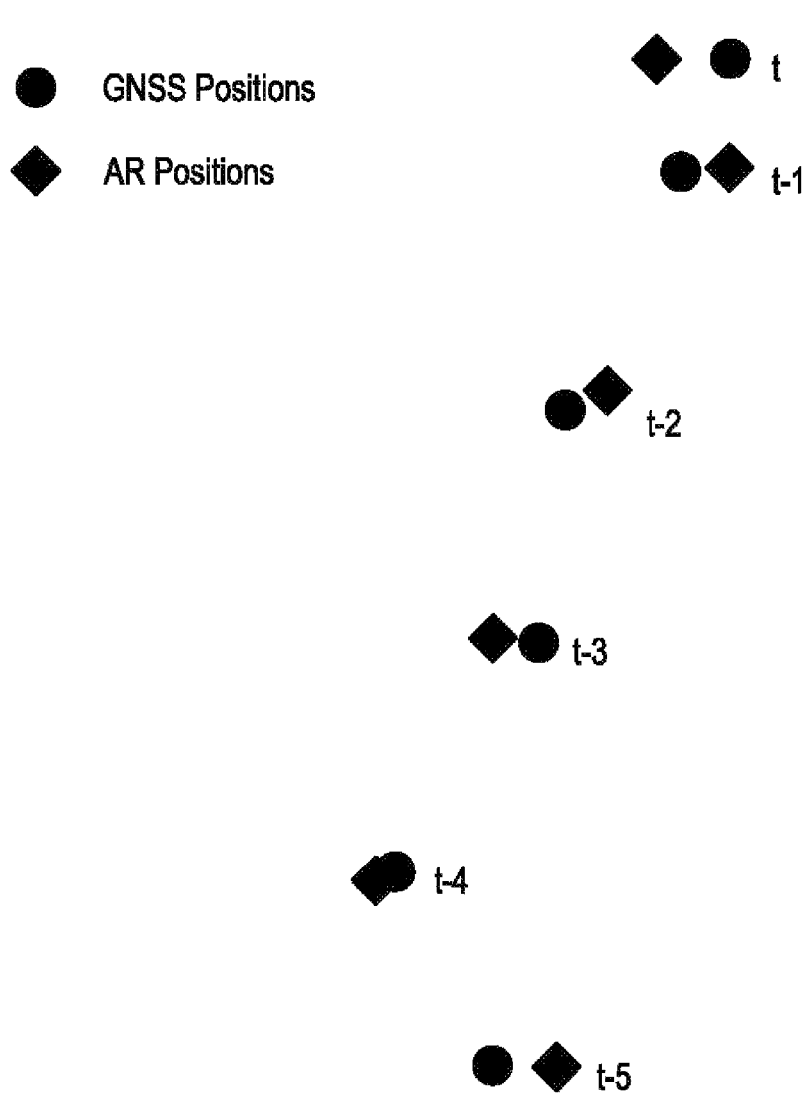
FIG. 8 illustrates an example of geographic coordinate points and mediated reality (MR) points over six time points, in accordance with the system of FIG. 1.

FIG. 8 illustrates an example of a plurality of geographic coordinate points (in this example, GNSS positions) and a plurality of MR coordinate points (in this example, AR positions). In this example, the coordinate points at time 't' represent the current or most recently determined coordinate points; and coordinate points at times 't−1' through 't−5' represent coordinate points that were determined at times chronologically into the past.

Figure 9:
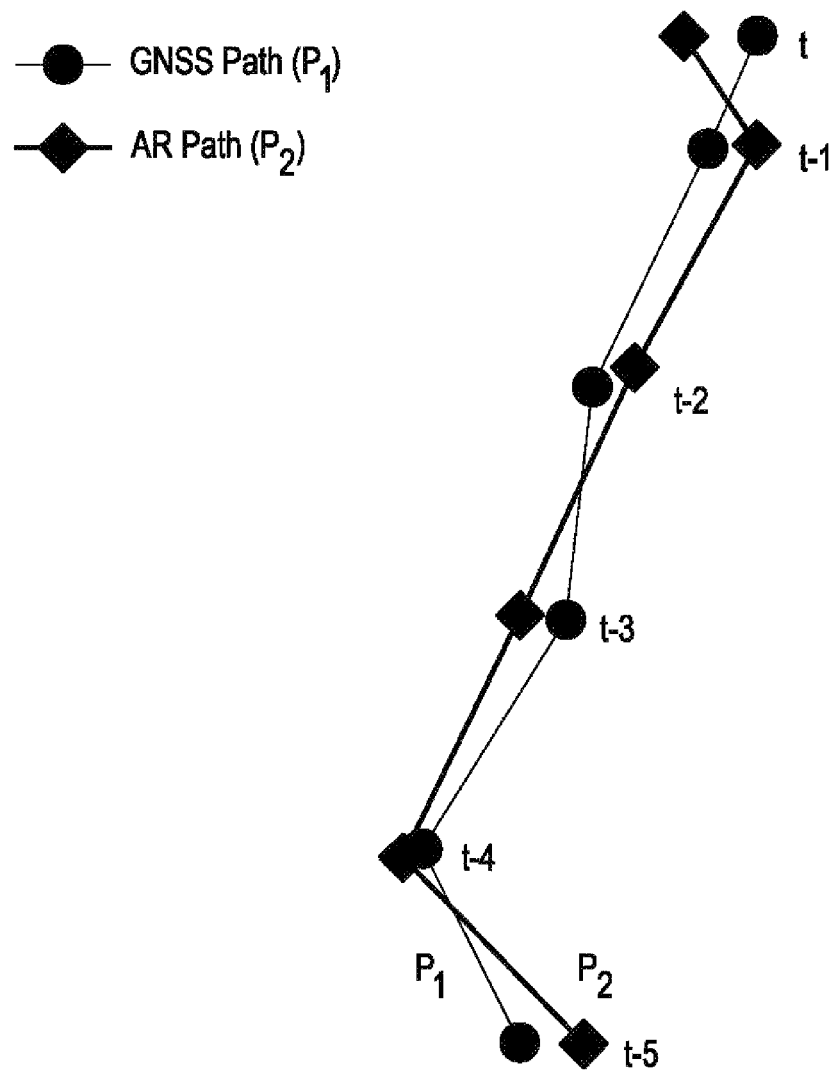
FIG. 9 illustrates, using the example of FIG. 8, a geographic path and an MR path, in accordance with the system of FIG. 1.

At block 206, in some cases, the receiver module 172 determines a geographic path 'P$_1$' (in this example, a GNSS path) from a recent geographic coordinate point at time 't' through 'n' geographic coordinate points into the past at times 't−n'. In the example of FIG. 9, the geographic path 'P$_1$' is constructed from the geographic coordinate point at time t through the geographic coordinate points respectively at times t−1, t−2, t−3, t−4, and t−5.

At block 208, in some cases, the MR module 170 determines an MR path 'P$_2$' (in this example, an AR path) from a recent MR coordinate point at time 't' through 'n' MR coordinate points into the past at times 't−n'. In the example of FIG. 9, the MR path 'P$_2$' is constructed from the MR coordinate point at time t through the MR coordinate points respectively at times t−1, t−2, t−3, t−4, and t−5. It is appreciated that any suitable number of coordinate points into the consecutive past ('n') can be used; so long as the number of coordinate points into the consecutive past is greater than or equal to two (n≥2) in order to form the paths.

Figure 10:
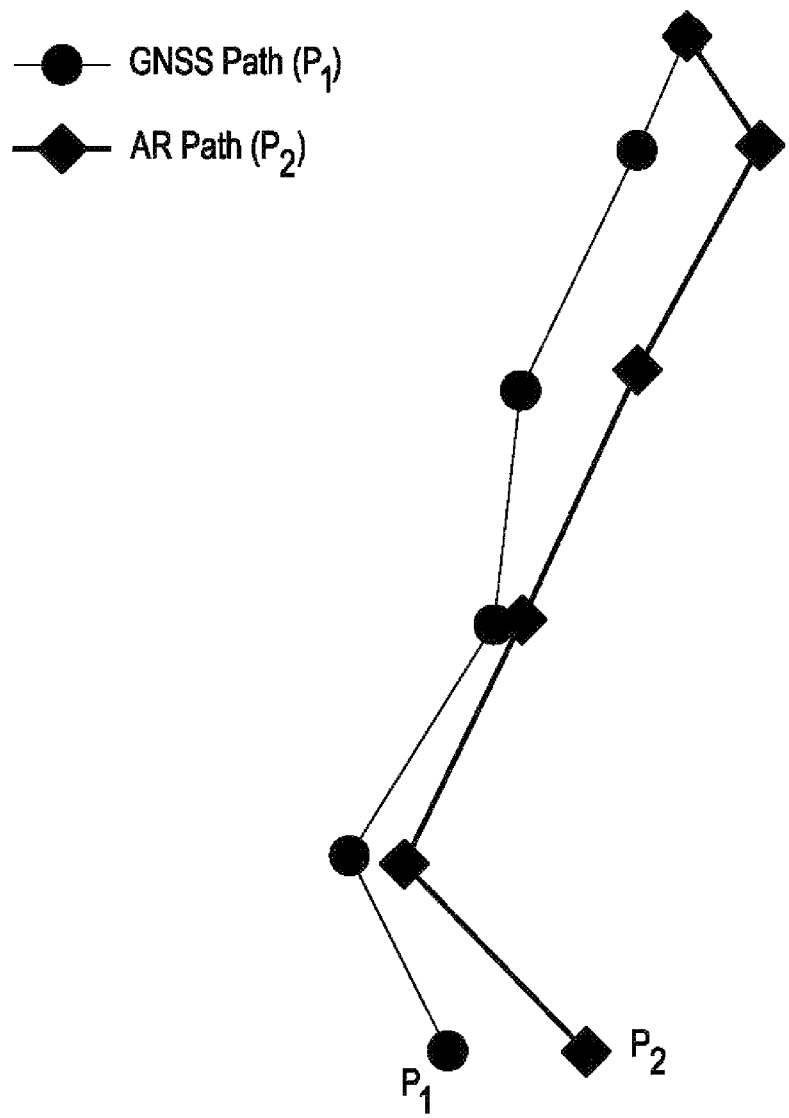
FIG. 10 illustrates, using the example of FIG. 8, a translation of the geographic path and/or the MR path, in accordance with the system of FIG. 1.

In some cases, at block 210, the positioning module 174 can co-locate the coordinate points of the MR path and the geographic path at the most recent time 't'. In some cases, as illustrated in the example of FIG. 10, the positioning module 174 can translate the position of the coordinate points in the MR path such that the MR coordinate point at time is co-located at the position of the geographic coordinate point at time 't'. In other cases, the positioning module 174 can translate the position of the coordinate points in the geographic path such that the geographic coordinate point at time 't' is co-located at the position of the MR coordinate point at time 't'. In further cases, both the MR path and the geographic path can be translated such that the respective coordinate points at time 't' are co-located. As illustrated in FIG. 10, in most cases, after translation in position, the MR path and the geographic path maintain the same size, shape, and orientation. In further cases, the positioning module 174 can skip the co-locating described above, and can determine the trend lines for both paths, as described below, by determining the angle between the trend lines without co-location. Generally, co-location is advantageous because it makes it easier to understand for a user to identify operation of the bearing correction.

Figure 11:
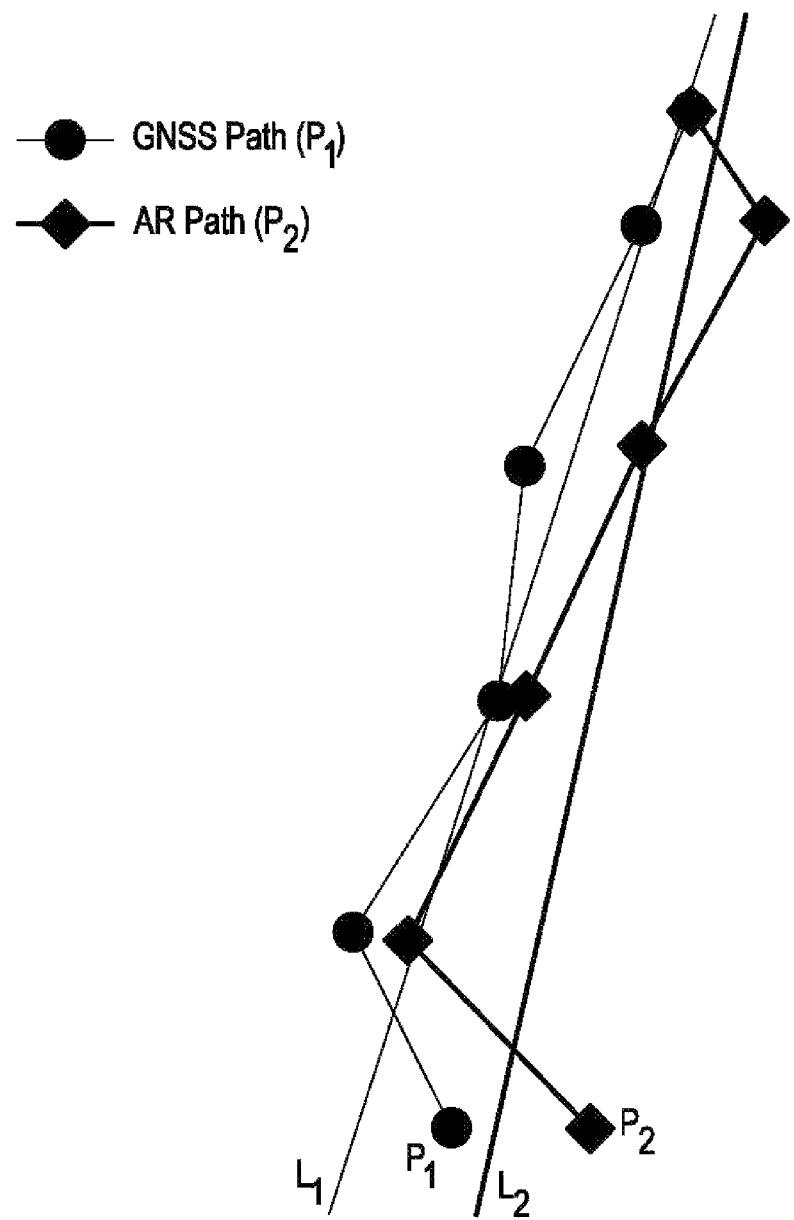
FIG. 11 illustrates, using the example of FIG. 8, a geographic trend line and an MR trend line, in accordance with the system of FIG. 1.

At block 212, the positioning module 174 determines a geographic trend line 'L$_1$' for the geographic path. In an example, the positioning module 174 can perform a linear regression on the geographic coordinate points in the geographic path to determine the geographic trend line; such as performing a least-squares regression analysis. It is appreciated that any suitable data fitting approach for determining the geographic trend line can be used; for example, Bayesian linear regression, least absolute deviations, percentage regression, ridge regression, or the like. In the example of FIG. 11, the geographic trend line 'L$_1$' is determined using the geographic path 'P$_1$'.

At block 214, the positioning module 174 determines an MR trend line 'L$_2$' for the MR path. In an example, the positioning module 174 can perform a linear regression on the MR coordinate points in the MR path to determine the MR trend line; such as performing a least-squares regression analysis. It is appreciated that any suitable data fitting approach for determining the MR trend line can be used; for example, Bayesian linear regression, least absolute deviations, percentage regression, ridge regression, or the like. In the example of FIG. 11, the MR trend line 'L$_2$' is determined using the MR path 'P$_2$'.

In further cases, determining the geographic path 'P$_1$' at block 206 and determining MR path 'P$_2$' at block 208 can be omitted. In these cases, the positioning module 174 can determine the geographic trend line 'L$_1$' from the geographic coordinate points themselves at block 212 and can determine the MR trend line '$L_2$' from the MR coordinate points themselves at block 214; with or without co-location of the most recent MR and geographic coordinate points at block 210.

Figure 12:
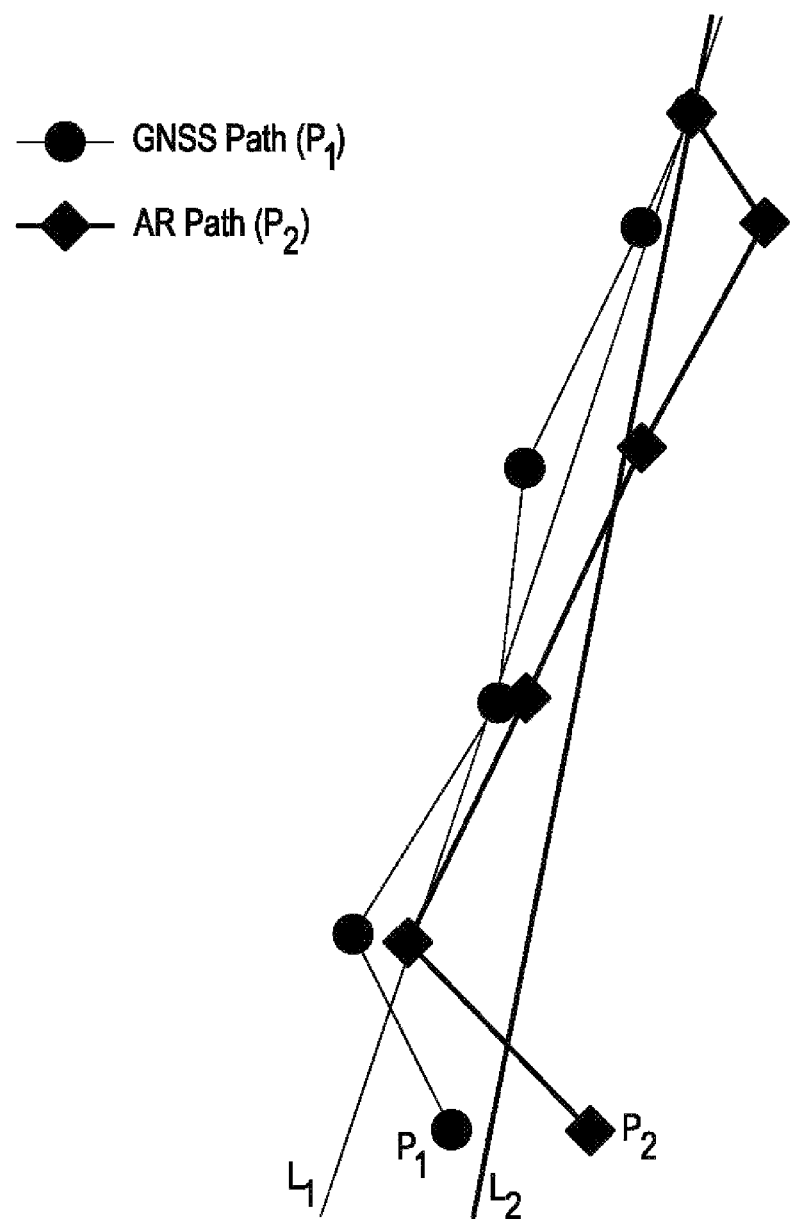
FIG. 12 illustrates, using the example of FIG. 8, a geographic transformation of the geographic path and/or the MR path, in accordance with the system of FIG. 1.

In some case, at block 216, the positioning module 174 performs a geometric transformation to have the geographic trend line '$L_1$' and the MR trend line '$L_2$' intersect at the co-located coordinate points of the MR path and the geographic path at the most recent time 't'. The geographic transformation can include, for example, a translation, a rotation, or both. Performance of such rotation can involve rotating the geographic trend line '$L_1$', the MR trend line '$L_2$', or both. FIG. 12 illustrates an example of the geographic transformation of the trend lines '$L_1$' and '$L_2$' to have them intersect at the co-located coordinate points of the MR path and the geographic path at the most recent time 't'.

Figure 13:
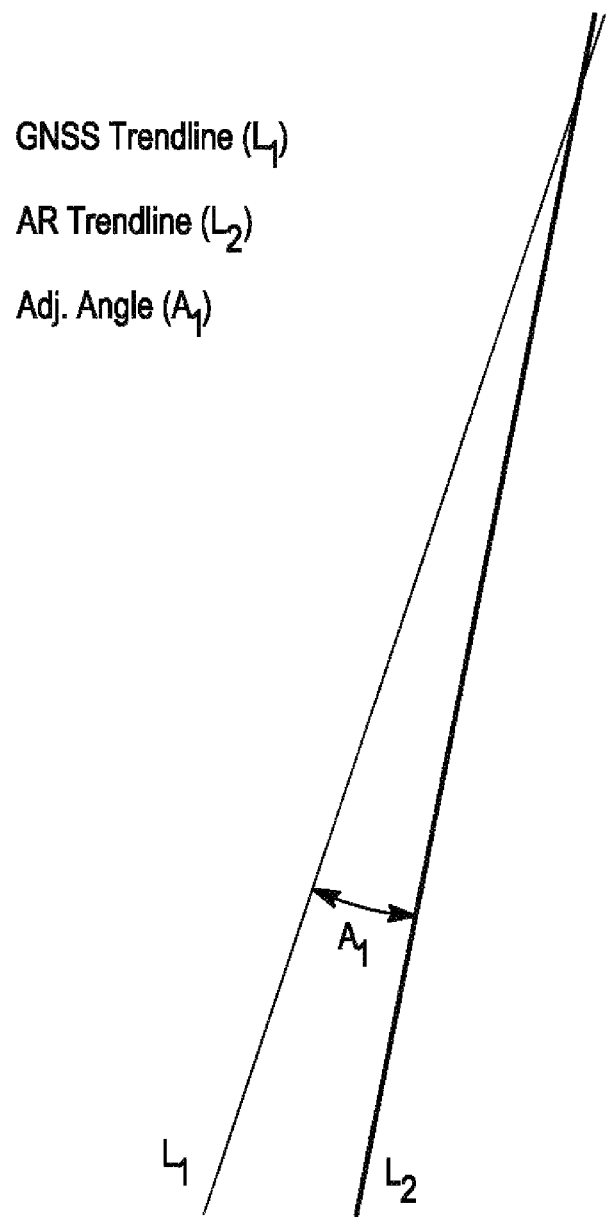
FIG. 13 illustrates, using the example of FIG. 8, determination of a correction angle, in accordance with the system of FIG. 1.

At block 218, the correction module 176 determines a correction angle '$A_1$' between the geographic trend line '$L_1$' and the MR trend line '$L_2$'. FIG. 13 illustrates an example of the correction angle '$A_1$' determined between the geographic trend line '$L_1$' and the MR trend line '$L_2$'. In some embodiments, the correction angle '$A_1$' can be outputted to the non-volatile storage 162, to the database 166, to the mediated reality device 192 via the user interface 156, or to other computing systems via the network interface 160.

Figure 14:
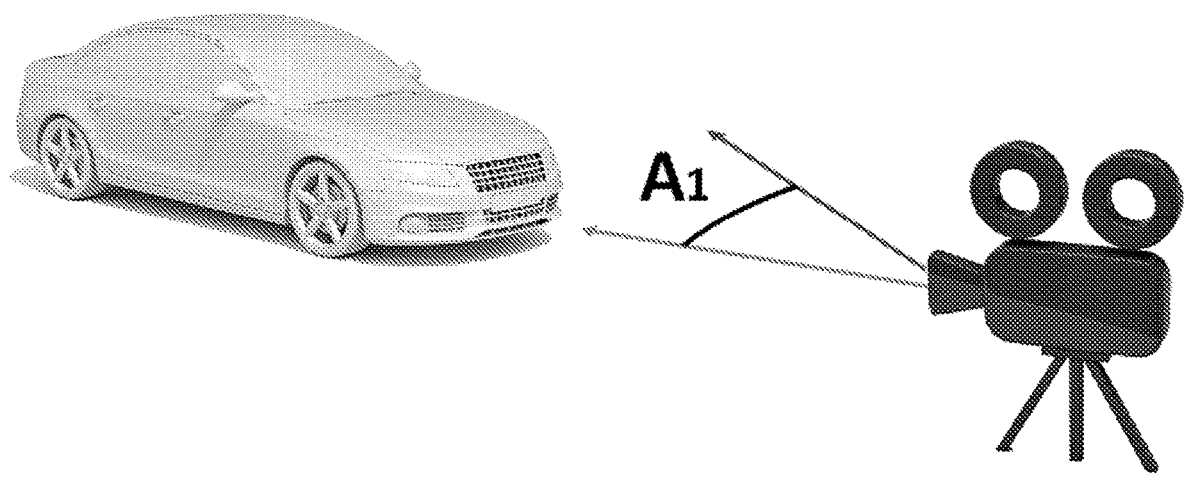
FIG. 14 illustrates an example of mediated reality device showing an example of a difference of virtual viewpoint using a correction angle, in accordance with the system of FIG. 1.
Figure 15:
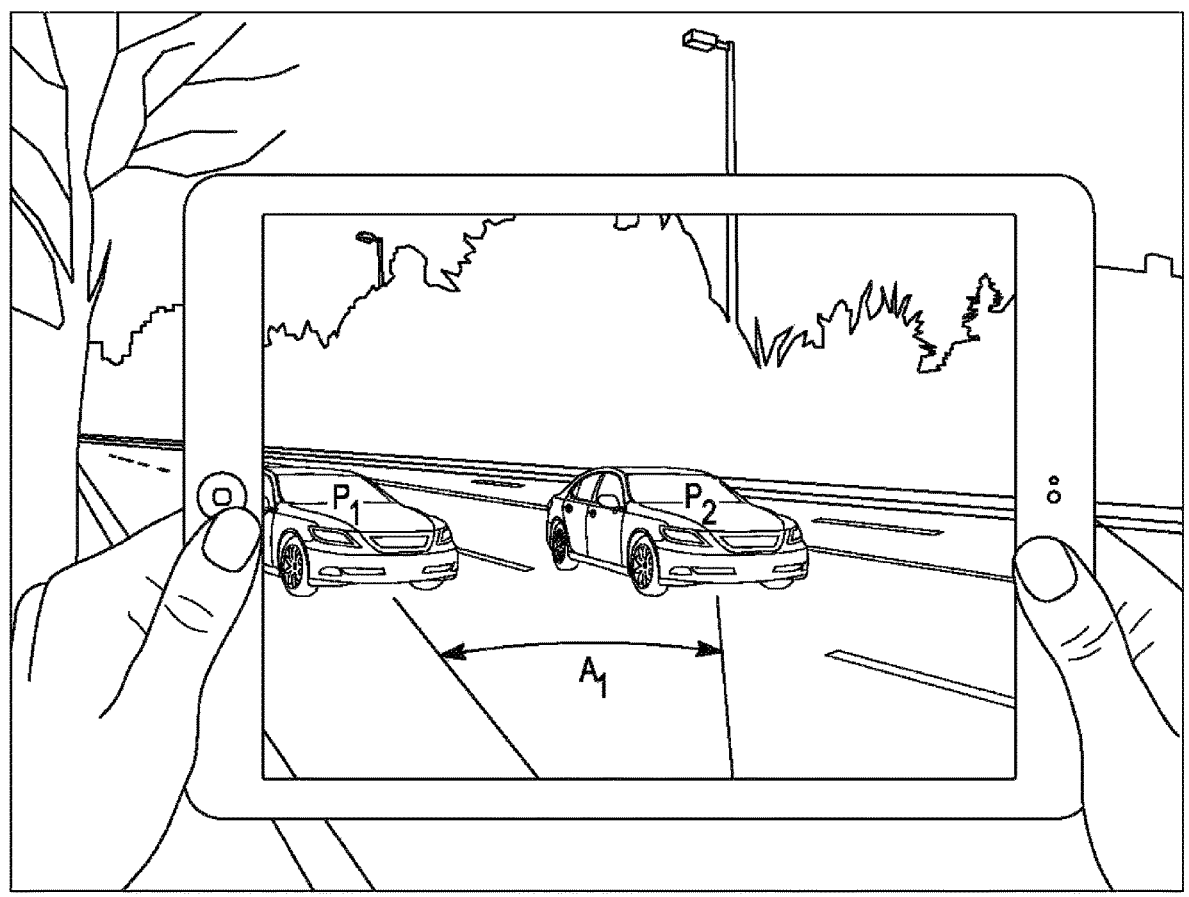
FIG. 15 illustrates an example of a virtual camera being adjusted by the determined correction angle '$A_1$', in accordance with the system of FIG. 1.

At block 220, the correction module 176 adjusts a virtual viewpoint of the positions of virtual representation of geospatial objects present in the mediated reality by the determined correction angle '$A_1$'. FIGS. 14 and 15 illustrates examples of corrections of a position of a geospatial object, in these examples, a car. The position of the geospatial object is corrected by an amount equivalent to angle '$A_1$'. FIG. 14 illustrates a mediated reality device 192, being a tablet computer. FIG. 14 illustrates a diagram of a virtual viewpoint (or 'virtual camera') being adjusted by the determined correction angle '$A_1$'; where the 'virtual camera' includes views of the geospatial objects in the environment. FIG. 15 illustrates the outcome of such correction by showing a difference of virtual viewpoint of a position of the geospatial object along the geographic path '$P_1$' and the MR path '$P_2$', along with the correction angle between them '$A_1$'. In some cases, the mediated reality with the corrected orientation of the 'virtual camera' can be displayed to a user via the mediated reality device 192. In these cases, the geospatial objects in the 'virtual camera' can be overlaid on the real scene; for example, displaying the virtual geospatial objects in the virtual viewpoint superimposed on an image of the real scene captured by the mediated reality device 192. The correction meaning that placement of virtual objects in the virtual viewpoint will substantially correspond to associated positions and headings in the real scene.

Information and geographical coordinates of a physical position for each of the geospatial objects can be located on the RAM 154 or the database 166, or received from the network interface 160 or the user interface 156. In some cases, the geospatial objects correspond to objects physically located in space which have been collected using any suitable approach; for example, using GNSS, laser mapping, or the like. The geographical coordinates can be relative to the surface of the earth, for example latitude and longitude. In other cases, the geographical coordinates can be relative to another object; for example, relative to a building or landmark. In some cases, the object information includes other properties; for example, an elevation, an object type, an object size, an object orientation, a material type, and the like. Visual representation of the geospatial objects can be, for example, a three-dimensional (3D) digital-twin model resembling the object. In further cases, the visual representation can be, for example, a symbol representing the object, such as a point, a flag, a tag, or the like. In further cases, the visual representation can be, for example, a schematic representation, a raster image, or the like.

In some embodiments, blocks 202 to 220 can be repeated for successive time points. In this way, at each successive time point, the coordinate points of the MR path and the geographic path will include the most recent time point as 't', and the 'n' consecutive time points into the past. It is appreciated that such repetition can occur on regular intervals, irregular intervals, triggered by specific events (for example, the reception of GNSS data or changes in position greater than a threshold), triggered by a user, or the like.

It is appreciated that for clarity of illustration, method 200 and the examples of FIGS. 8 to 15, describe coordinates, paths, lines, and angles in two-dimensional space; however, such coordinates, paths, lines, and angles can be described in three-dimensional space. For example, including X and Y coordinates along the surface of the Earth and a Z coordinate as an elevation relative to the surface of the Earth.

It is appreciated that while the present disclosure may refer to points in time, this can include time ranges. As an example, an MR coordinate point at a particular time can be associated with a geographic coordinate point if it falls within a given time range of receiving that geographic coordinate point; for example, ±1 second, ±1 minute, or the like.

In further embodiments, instead of separately determining a trend line for the geographic path, the positioning module 174 can determine a converged trend line using the points in the geographic path and the MR path. The correction module 176 can then determine the correction angle as the angle between a trendline of the MR path and the converged trend line.

Advantageously, embodiments of the present disclosure can cope with error and imprecision due to positioning inaccuracy in the geographic receiver (such as with GNSS) and in the MR positioning by using paths comprising multiple coordinate points. By using the trend line of the MR path in comparison with the trend line of the geographic path, the system 150 can get better accuracy. As an example, the present embodiments provide substantial advantages over the vector approach described herein. The vector approach is highly susceptible to error in the recent readings of position from the geographic receiver because it only takes into account two readings and the vector between them. The present embodiments substantially reduce the susceptibility to error by, for example, using a trend line though a path which smooths (or averages) randomness causing error by incorporating a number of past coordinate points. Additionally, generally in the vector approach, the adjusted value, rather than the raw value, of the coordinate reading at the previous timepoint is used when generating the vector. In contrast, embodiments of the present embodiment use raw values of the coordinates in the path at previous time points; allowing the system 150 to take into account the variation in the coordinate readings and better provide a smoothed-out trend line.

While the mediated reality device 192 can include a camera to capture a physical scene and a screen to display a mixture of physical and virtual objects, it is contemplated that any apparatus for blending virtual and real objects can be used; for example, a holographic system that displays holographic augmentation or projects holograms.

In an example, advantageously, the present embodiments can be used for supporting various MR devices; particularly those which are generally unsupported by GNSS device vendors. Microsoft™ HoloLens™ may be an example of such unsupported MR device. In most approaches, a direct bridge needs to be generated by the GNSS receiver to the MR device, such as over the Bluetooth™ protocol, which requires direct support for the respective MR device. Advantageously, instead of having to build a bridge directly for each device, a shared computing resource can be used; for example, the system 150 acting as a cloud computing system in communication with both the receiver computing device 190 and the mediated reality device 192 over the Internet via the network interface 160. In some cases, a session identifier, such as a unique number, can be stored in memory and used to associate the particular receiver computing device 190 with the respective mediated reality device 192 on the system 150. In an example, the receiver computing device 190 can be a smartphone with GPS and/or other positioning modalities.

Figure 16:
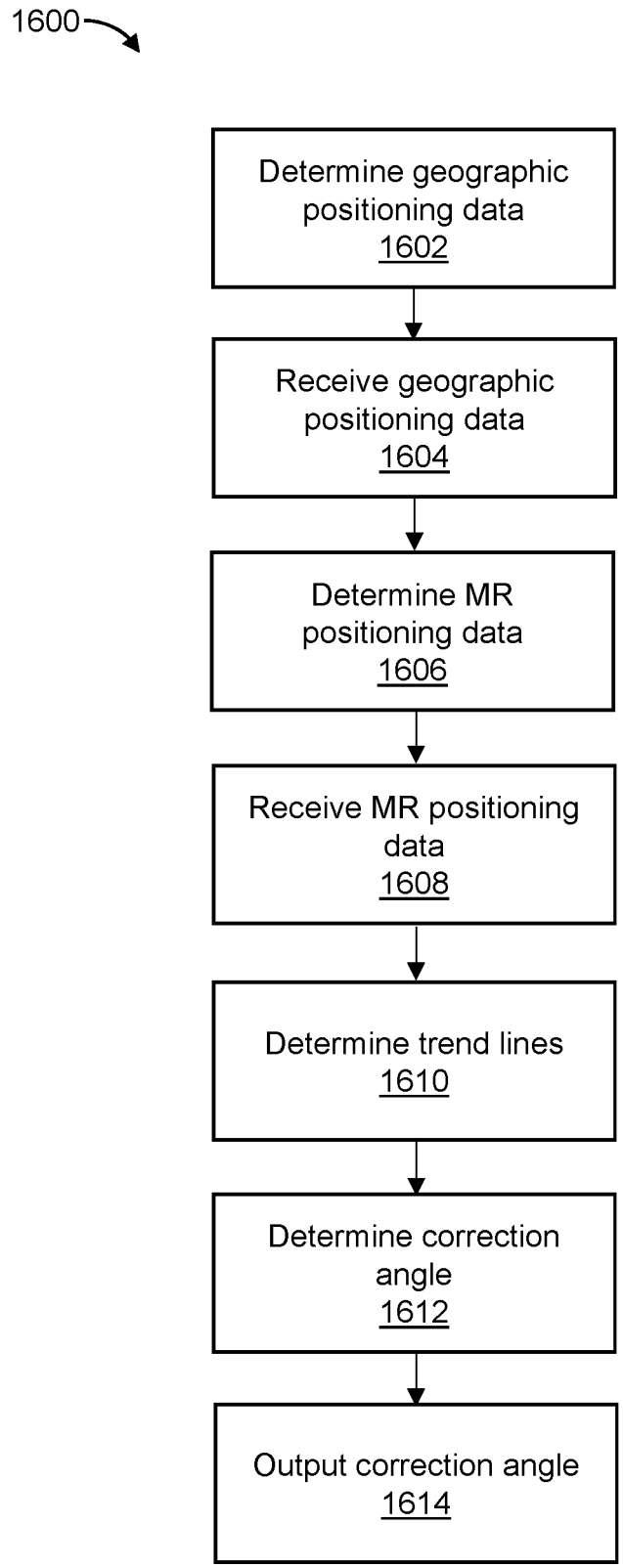
FIG. 16 illustrates a flow diagram of a method for coordinating MR positioning data and geographic positioning data, according to an embodiment.

As illustrated in FIG. 16, an example embodiment of a method 1600 for coordinating MR positioning data and geographic positioning data is shown. At block 1602, the receiver computing device 190 determines geographic positioning data comprising a plurality of geographic coordinate points, as described herein. Each geographic coordinate point comprising a position of the receiver computing device 190 at a respective point in time (t).

At block 1604, the receiver computing device 190 communicates the geographic positioning data to the receiver module 172 via the network interface 160. Each of the geographic coordinate points in the geographic positioning data having an associated timestamp associated with the time it was collected by the receiver computing device 190.

At block 1606, the mediated reality device 192 determines MR positioning data comprising a plurality of MR coordinate points using camera images and/or other sensor information received by the mediated reality device 192, as described herein.

At block 1608, the mediated reality device 192 communicates the MR positioning data to the MR module 170 via the network interface 160. In further cases, the mediated reality device 192 communicates sensor data to the MR module 170 and the MR module 170 determines the MR positioning data. Each MR coordinate point can be associated with one of the geographic coordinate points having a timestamp at, or around, an associated point in time (t) of a timestamp when the MR coordinate point was collected.

At block 1610, the positioning module 174 determines a geographic trend line '$L_1$' from the geographic positioning data and an MR trend line '$L_2$' from the MR positioning data, as described herein with respect to method 200.

At block 1612, the correction module 176 determines a correction angle '$A_1$' between the geographic trend line '$L_1$' and the MR trend line '$L_2$', as described herein with respect to method 200.

At block 1614, the correction module 176 outputs the correction angle '$A_1$' as described herein with respect to method 200.

In further cases, the functions of the MR module 170 at block 1608, the functions of the positioning module 174 at block 1610, and the functions of the correction module 176 at blocks 1612 and 1614 can be performed on or as part of the mediated reality device 192. In this case, the system 150 acts as an intermediary and repository of the geographic positioning data.

The method 1600 allows the system 150 to use multiple coordinate points from the past, which is advantageous for using trend lines to converge the MR positioning data and geographic positioning data, as described herein. Thus, allowing consolidation of previous positions in the shared resource to accurately determine a correction angle.

In the present embodiments, the use of a number of previous coordinate points to converge the MR positioning data and geographic positioning data provides substantial advantages. As an example, if the system 150 is under fairly quick or constant movement, a geographic coordinate point can represent a position held in the past (ex., two-seconds ago); while the MR coordinate points are received more frequently but subject to drift. In this way, if only the one or two most recent geographic coordinate points are used to adjust position, there may be abrupt corrections. In contrast, using a plurality of geographic coordinate points allows for such abruptness to be smoothed out as the system is not reliant on merely one or two previous coordinate points for the totality of its corrections.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method for converging mediated reality (MR) positioning data and geographic positioning data, the method comprising:
   receiving three or more MR coordinate points each associated with different points in time;
   receiving three or more geographic coordinate points each associated with different points in time;
   for each of the geographic coordinate points, determining which of the MR coordinate points are nearest in time and associating the geographic coordinate point with such MR coordinate point;
   determining a geographic trend line using data fitting on the three of more geographic coordinate points;
   determining an MR trend line using data fitting on the three or more MR coordinate points;
   determining a correction angle as an angle between the geographic trend line and the MR trend line; and
   outputting the correction angle.

2. The method of claim 1, further comprising adjusting orientation of a virtual viewpoint by the correction angle, the virtual viewpoint comprising positions of virtual geospatial objects present in a mediated reality environment.

3. The method of claim 2, further comprising displaying the virtual geospatial objects in the adjusted virtual viewpoint superimposed on an image of a real scene captured as part of the mediated reality.

4. The method of claim 1, wherein the MR positioning data comprises at least one of photogrammetry data, accelerometer data, inertial sensor data, and gyroscope data for determining orientation.

5. The method of claim 1, further comprising receiving a geographic coordinate point and an MR coordinate point associated with a subsequent point in time, and repeating determining the geographic trend line, determining the MR trend line, determining the correction angle, and outputting the correction angle.

6. The method of claim 5, wherein the geographic coordinate points form a set of geographic coordinate points of a predetermined size, wherein the MR coordinate points form a set of MR coordinate points of the predetermined size, wherein for each subsequent point in time, the set of geographic coordinate points comprises the geographic coordinate point at the subsequent point in time and geographic points in time associated with preceding points in time until the set of geographic points equals the predetermined size, and the set of MR coordinate points comprises the MR coordinate point at the subsequent point in time and MR points in time associated with preceding points in time until the set of MR points equals the predetermined size.

7. The method of claim 1, wherein the geographic trend line and the MR trend line are determined using a regression analysis.

8. The method of claim 1, further comprising determining a geographic path from the geographic coordinate points and determining an MR path from the MR coordinate points.

9. A system for converging mediated reality (MR) positioning data from an MR device and geographic positioning data from a geographic receiver, the system comprising one or more processors and data storage memory in communication with the one or more processors, the one or more processors configured to execute:
- an MR module to receive three or more MR coordinate points each associated with different points in time;
- a receiver module to receive three or more geographic coordinate points each associated with different points in time, and, for each of the geographic coordinate points, determine which of the MR coordinate points are nearest in time and associate the geographic coordinate point with such MR coordinate point;
- a positioning module to determine a geographic trend line using data fitting on the three of more geographic coordinate points, and determine an MR trend line using data fitting on the three of more MR coordinate points; and
- a correction module to determine a correction angle as an angle between the geographic trend line and the MR trend line and output the correction angle.

10. The system of claim 9, wherein the correction module further adjusts orientation of a virtual viewpoint by the correction angle, the virtual viewpoint comprising positions of virtual geospatial objects present in a mediated reality environment.

11. The system of claim 10, wherein the mediated reality device displays the virtual geospatial objects in the adjusted virtual viewpoint superimposed on an image of a real scene captured by the mediated reality device.

12. The system of claim 9, wherein the MR positioning data comprises at least one of photogrammetry data, accelerometer data, inertial sensor data, and gyroscope data, as determined by the MR device, for determining orientation.

13. The system of claim 9, wherein the receiver module further receives a geographic coordinate point associated with a subsequent point in time and the MR module further receives an MR coordinate point associated with the subsequent point in time, the processor repeating execution of determining the geographic trend line, determining the MR trend line, determining the correction angle, and outputting the correction angle.

14. The system of claim 13, wherein the geographic coordinate points form a set of geographic coordinate points of a predetermined size, wherein the MR coordinate points form a set of MR coordinate points of the predetermined size, wherein for each subsequent point in time, the set of geographic coordinate points comprises the geographic coordinate point at the subsequent point in time and geographic points in time associated with preceding points in time until the set of geographic points equals the predetermined size, and the set of MR coordinate points comprises the MR coordinate point at the subsequent point in time and MR points in time associated with preceding points in time until the set of MR points equals the predetermined size.

15. The system of claim 9, wherein the geographic trend line and the MR trend line are determined using a regression analysis.

16. The system of claim 9, wherein the receiver module further determines a geographic path from the geographic coordinate points and the MR module further determines an MR path from the MR coordinate points.

17. A mediated reality (MR) device comprising a processor, a memory, a geographic receiver, a display, and a camera, the processor configured to execute:
- an MR module to determine three or more MR coordinate points using images received from the camera, each of the MR coordinate points associated with different points in time;
- a receiver module to receive three or more geographic coordinate points from the geographic receiver, the geographic coordinate points each associated with different points in time, and, for each of the geographic coordinate points, determine which of the MR coordinate points are nearest in time and associate the geographic coordinate point with such MR coordinate point;
- a positioning module to determine a geographic trend line using data fitting on the three of more geographic coordinate points, and determine an MR trend line using data fitting on the three of more MR coordinate points; and
- a correction module to determine a correction angle as an angle between the geographic trend line and the MR trend line and output the correction angle.

18. The MR device of claim 17, wherein the correction module further determines orientation of a virtual viewpoint by the correction angle, the virtual viewpoint comprising positions of virtual geospatial objects present in a mediated reality environment.

19. The MR device of claim 18, wherein the display displays the virtual geospatial objects in the adjusted virtual viewpoint superimposed on an image of a real scene captured by the camera.

20. The MR device of claim 17, wherein the MR positioning data comprises at least one of data from optical tracking, data from an accelerometer, data from an inertial sensor, and data from a gyroscope, for determining orientation.

* * * * *